US008458293B1

(12) United States Patent
Lemaitre et al.

(10) Patent No.: US 8,458,293 B1
(45) Date of Patent: Jun. 4, 2013

(54) NETWORK ACCESS FOR NON-NETWORK-ENABLED DEVICES

(75) Inventors: Marcus J. Lemaitre, Leesburg, VA (US); Ginger D. McClendon, Herndon, VA (US); Bin Shen, Falls Church, VA (US); Abraham J. Kinney, Sterling, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 417 days.

(21) Appl. No.: 12/016,006

(22) Filed: Jan. 17, 2008

(51) Int. Cl.
*G06F 15/16* (2006.01)

(52) U.S. Cl.
USPC .......................................................... 709/218

(58) Field of Classification Search
USPC ........................................................... 709/218
See application file for complete search history.

(56) References Cited

U.S. PATENT DOCUMENTS

| 6,945,454 | B2* | 9/2005 | Tournemille et al. ......... 235/375 |
| 7,213,766 | B2* | 5/2007 | Ryan et al. ..................... 235/492 |
| 7,454,783 | B2* | 11/2008 | Dupouy et al. .................... 726/7 |
| 7,508,946 | B2* | 3/2009 | Yamagata et al. ............. 380/270 |
| 7,597,250 | B2* | 10/2009 | Finn ................................ 235/380 |
| 7,730,484 | B2* | 6/2010 | von Tetzchner .............. 717/178 |
| 7,762,470 | B2* | 7/2010 | Finn et al. ...................... 235/492 |
| 7,769,867 | B2* | 8/2010 | Fukuda ....................... 348/231.9 |
| 7,870,274 | B1* | 1/2011 | Contino et al. ................ 709/229 |
| 7,912,503 | B2* | 3/2011 | Chang et al. .................. 455/557 |
| 8,001,274 | B2* | 8/2011 | Srinivasan et al. ............ 709/246 |
| 2004/0085944 | A1* | 5/2004 | Boehm ........................ 370/338 |
| 2004/0211835 | A1* | 10/2004 | Tournemille et al. ......... 235/441 |
| 2004/0255081 | A1* | 12/2004 | Arnouse ........................ 711/115 |
| 2005/0109841 | A1* | 5/2005 | Ryan et al. ..................... 235/380 |
| 2005/0120214 | A1* | 6/2005 | Yeates et al. ................... 713/171 |
| 2006/0069814 | A1* | 3/2006 | Abraham et al. .................. 710/8 |
| 2006/0075174 | A1* | 4/2006 | Vuong ........................... 710/302 |
| 2006/0180674 | A1* | 8/2006 | Margalit et al. ............... 235/492 |
| 2006/0208066 | A1* | 9/2006 | Finn et al. ...................... 235/380 |
| 2006/0265390 | A1* | 11/2006 | Aldrich et al. .................. 707/10 |
| 2007/0022469 | A1* | 1/2007 | Cooper et al. ..................... 726/3 |
| 2007/0035764 | A1* | 2/2007 | Aldrich et al. ............... 358/1.15 |
| 2007/0073937 | A1* | 3/2007 | Feinberg et al. ................ 710/62 |
| 2007/0186106 | A1* | 8/2007 | Ting et al. ..................... 713/168 |
| 2007/0214492 | A1* | 9/2007 | Gopi et al. ........................ 726/2 |
| 2007/0239935 | A1* | 10/2007 | Chen ............................. 711/115 |

(Continued)

OTHER PUBLICATIONS

Posted by Mat Lu, "Secure your Mac: SecuriKey USB dongle," http://www.tuaw.com/2007/09/27/secure-your-mac-securikey-usb-dongle/, The Unofficial Apple Weblog (TUAW), Sep. 27, 2007, 2 pp.

(Continued)

*Primary Examiner* — Kevin Bates
(74) *Attorney, Agent, or Firm* — Symbus Law Group, LLC; Charles Lobsenz; Clifford D. Hyra

(57) ABSTRACT

A pocket-size authentication token for authenticating an individual to a network and enabling a wireless network connection for a non-network-enabled device. Authentication token acts as a security token or dongle, supplying credentials of one individual to the network in order to gain access to the network. Authentication token provides the electrical interface and all logic required to communicate with the network, utilizing a wireless network access device. Authentication token provides the electrical interface and all logic required to communicate with the non-network-enabled device. Authentication token transfers data from the non-network-enabled device to the individual's online account.

19 Claims, 7 Drawing Sheets

U.S. PATENT DOCUMENTS

2007/0260797 A1* 11/2007 Chen .................... 710/301
2007/0282969 A1* 12/2007 Dietrich et al. ............. 709/217
2009/0037998 A1* 2/2009 Adhya et al. ............... 726/11
2010/0234051 A1* 9/2010 Holden et al. .............. 455/466

OTHER PUBLICATIONS

Perera, Rick, "USB Tokens Offer Pocket-Size Security," PC World, IDG News Service, http://www.pcworld.com/printable/article/id,89263/printable.html, Mar. 15, 2002, Hanover, Germany, 3 pp.

"Smart Dongle," Gemalto, Feb. 2007, 16 pp.

"Zoran: Every Media Player Connected Wirelessly to the Net—No PC," The Online Reporter, Jan. 14, 2007, http://www.onlinereporter.com/article.php?article_id=8477, 5 pp.

Christina Hecht, "Microchip Technology and Yipee, Inc. Offer a New Internet Connectivity Solution for PICmicro Microcontrollers," Chandler, Ariz, Jun. 21, 2001, http://200.9.176.189/web/Microchip/Disco2/1010/edit/prelease/archive/9_234/index.htm, 2 pp.

By ECT News Desk, MacNewsWorld, "Wippit Launches Wireless Music, Video Services," Sep. 15, 2004, http://www.macnewsworld.com/story/36617.html, 2 pp.

"Infrastructure-less USB Token Revealed by Gemalto," USB Technology, Hardware & Products News, Feb. 5, 2007, http://www.usb-core.co.uk/05-02-2007-infrastructure-less-usb-token-revealed-by-gemalto.html, 4 pp.

"Embedded TCP/IP—Internet Module and Cricket," LMB Technologie GmbH, http://www.lmb.de/en/3_index.htm?/en/3_internet_modul.htm, 1 p.

"Embedded TCP/IP—Applications, Vending Machines," LMB Technologie GmbH, http://www.lmb.de/en/3_index.htm?/en/3_internet_modul.htm, 1 p.

"Security Token," Wikipedia, http://en.wikipedia.org/wiki/Security_token, 8 pp.

* cited by examiner

NETWORK ACCESS FOR NON-NETWORK-ENABLED DEVICES

SUMMARY

The present invention is defined by the claims below. Embodiments of the present invention provide an apparatus and method for, among other things, authenticating an individual to a network and enabling wireless access to a network for a non-network-enabled (NNE) device. A pocket-size authentication token is provided. In the embodiments, the pocket-size authentication token provides both a physical and logical connection between the NNE device and a wireless network access device (WNA device). The pocket-size authentication token communicates with the NNE device and obtains information from the NNE device. The pocket-size authentication token utilizes the WNA device to connect with the network. The authentication token provides authentication to the network with some form of identification, such as user credentials, user name and password, for one individual. Once a connection is established, the pocket-size authentication token transfers data between the NNE device and one or more online accounts of the individual.

BRIEF DESCRIPTION OF THE SEVERAL VIEWS OF THE DRAWINGS

Illustrative embodiments of a pocket-size authentication token are described in detail below with reference to the attached drawing figures, which are incorporated by reference herein and wherein.

DETAILED DESCRIPTION

Embodiments of the present invention provide apparatuses and methods for wirelessly connecting a non-network-enabled device (NNE device) to a network, authenticating a single user of the NNE device to the network, and transferring data between the NNE device and the network.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| NNE | non-network-enabled |
| PC card | personal computer card |
| USB | Universal Serial Bus |
| WiMAX | Worldwide Interoperability for Microwave Access |
| WNA | Wireless Network Access |

Further, various technical terms are used throughout this description. An illustrative resource that fleshes out various aspects of these terms can be found in Newton's Telecom Dictionary by H. Newton, 22nd Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The particular embodiments herein are intended in all respects to be illustrative rather than restrictive. Alternative embodiments will become apparent to those skilled in the art to which the present invention pertains without departing from its scope.

Figure 1:
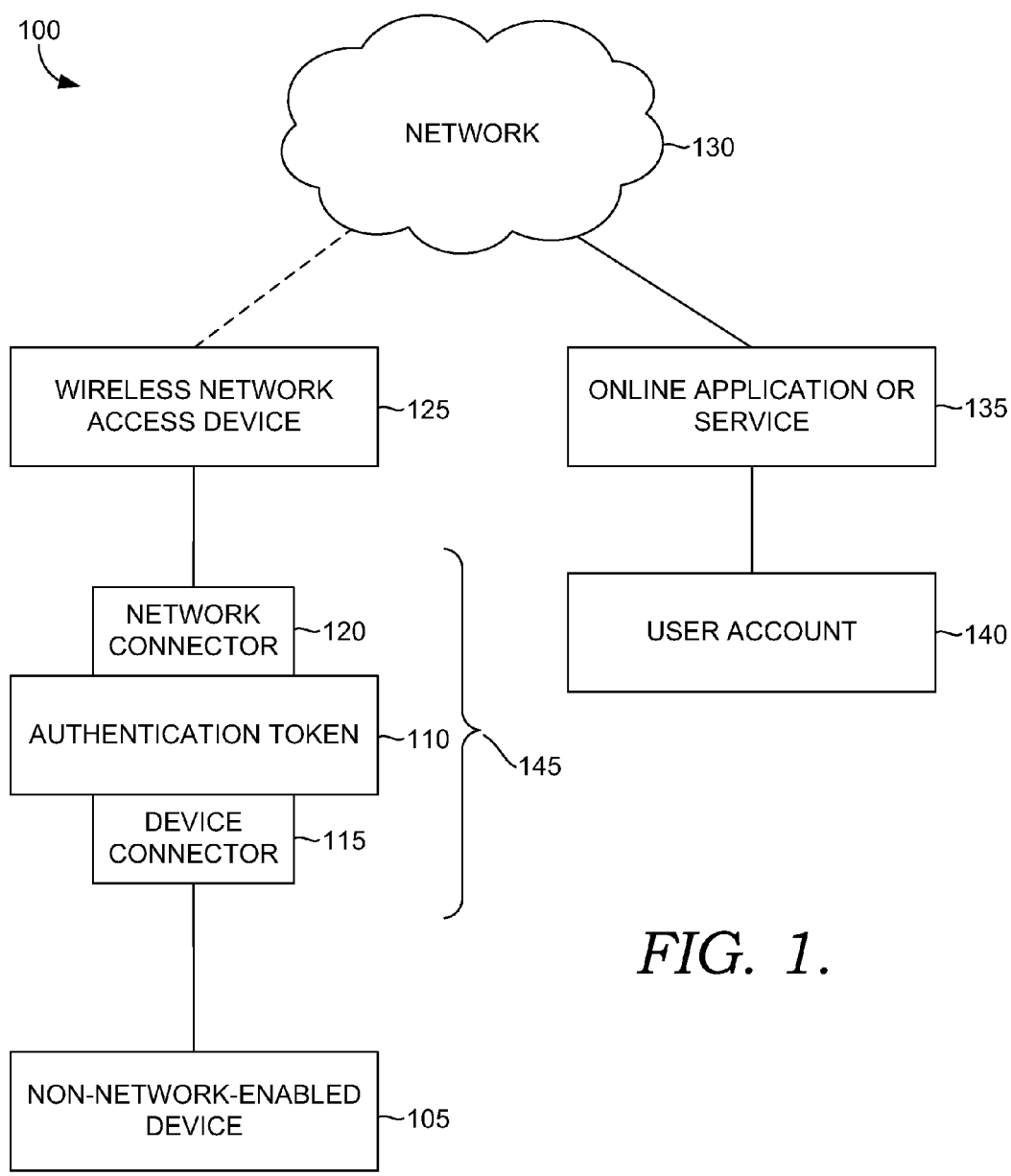
FIG. 1 is a schematic diagram of an exemplary overall system suitable for use in implementing embodiments of a pocket-size authentication token.

Referring to the drawings in general, and initially to FIG. 1 in particular, an exemplary operating environment for implementing embodiments of the present invention is shown and designated generally as network access 100. Network access 100 is but one example of a suitable operating environment and is not intended to suggest any limitation as to scope of use or functionality. Neither should the network access 100 be interpreted as having any dependency or requirement relating to any one or combination of components/modules illustrated.

With continued reference to FIG. 1, network access 100 includes a NNE device 105 that couples with an authentication token 110 utilizing a device connector 115 attached to the authentication token 110. The authentication token 110 additionally utilizes a network connector 120 to mechanically couple with a wireless network access (WNA) device 125. The authentication token 110, the device connector 115, and the network connector 120 are parts of a user identification system 145. The WNA device 125 provides wireless communication with a network 130. The network 130 in turn provides the NNE device a connection with an online application or service 135 and in some instances with a user account 140 for the online application 135.

The NNE device 105 may be any device with a physical communication port capable of transmitting and receiving data. Exemplary NNE devices may include, but are not limited to, devices with one or more communication ports, such as non-network-enabled computers, digital cameras, vending machines, and the like. Exemplary communication ports may include, but are not limited to, a Universal Serial Bus (USB) port. A NNE vending machine may have a communication port capable of transmitting and/or receiving data such as status of the machine, number of items remaining, cash box full indication, maintenance required indication, and the like. Again, exemplary communication ports may include, but are not limited to, a USB port.

The WNA device 125 may be any device with 1) the ability to communicate wirelessly with a network, and 2) the ability to communicate with the authentication token 110. Exemplary devices may include, but are not limited to, a Worldwide Interoperability for Microwave Access (WiMAX) card or a card compatible with WiMAX technology, based on the IEEE 802.16 standard or variations thereof, a WiFi card or a card compatible with WiFi technology, based on the IEEE 802.11 standard or variations thereof, and the like.

The authentication token 110 includes the device connector 115 and the network connector 120. The device connector 115 physically connects or couples the NNE device 105, and the authentication token 110, providing a connection capable of serving as a conduit for a logical connection. Exemplary device connectors 115 may include, but are not limited to, a mini-USB connector, such as physically couples with connectors typically found at least on digital cameras and other NNE devices. One of ordinary skill in the art would recognize that many other types of connectors are suitable for use, as well as connectors capable of coupling with adapters that convert from one type of connector to another.

The network connector 120 physically couples with the WNA device 125, providing a connection capable of serving as a conduit for a logical connection. Exemplary network connectors 120 may include, but are not limited to, a USB connector, as may be found at least on a WiMAX card or other WNA device 125.

The authentication token 110 combines network communication with a security token for a NNE device 105. A security token is a device that automatically authenticates a single user attempting to access the network and/or applications on the network. A security token connects with another device or system and supplies data that identifies, or enables the device or system to identify, automatically, without user intervention, a single user to which the token is assigned and the access authorization associated with that user. In embodiments the authentication token has the capability of identifying only a single user. Thus, the authentication token 110 enables the NNE device 105 to communicate with the network 130 and automatically, without user intervention, interact with whatever online services, applications, and/or accounts the user is authorized to access, based on the user identification data stored in the authentication token 110. The user identification data stored in the authentication token 110 includes at least a portion of a user profile associated with the user to which the authentication token 110 is assigned. The authentication token is pre-configured with the user profile such that it may automatically authenticate the single user to the network or applications on, or accessed via, the network. The user profile may contain information related to user identification, user credentials, username, password, online subscription information, online account information, and the like. The entire user profile may be stored in the authentication token 110, or a portion of the user profile may be stored in the authentication token 110 with the remaining portion(s) residing elsewhere, for instance, on the network.

One embodiment automatically, without user intervention, authenticates a user to an online photo sharing website, and uploads photos from a digital camera to the user's account on the photo sharing website. Additionally, because the embodiment serves as a security token, identifying one specific user, it allows the user to use any compatible camera, regardless of ownership, to upload photos to his or her account.

The network 130 may be any type of network capable of being accessed via a WNA device 125. Exemplary networks 130 may include, but are not limited to, a WiMAX network or a network compatible with WiMAX technology, based on the IEEE 802.16 standard or variations thereof, a WiFi network or a network compatible with WiFi technology, based on the IEEE 802.11 standard or variations thereof, the Internet, and the like. A network 130 may provide access to an online user account 140 for an online application or service 135. The online application or service 135 may be any application or service capable of residing on a network 130, including but not limited to, Web applications and Internet access. Exemplary user accounts 140 may include, but are not limited to, any type of online access requiring specific authorization for a user, before granting access to the user. Such an account may require registration, fees, and/or a subscription before granting access to a user. Exemplary user accounts may include, but are not limited to, online photo sharing accounts, email accounts, online bank accounts, online credit card accounts, online shopping accounts, podcast accounts, online game accounts, online music accounts, and the like.

Figure 2:
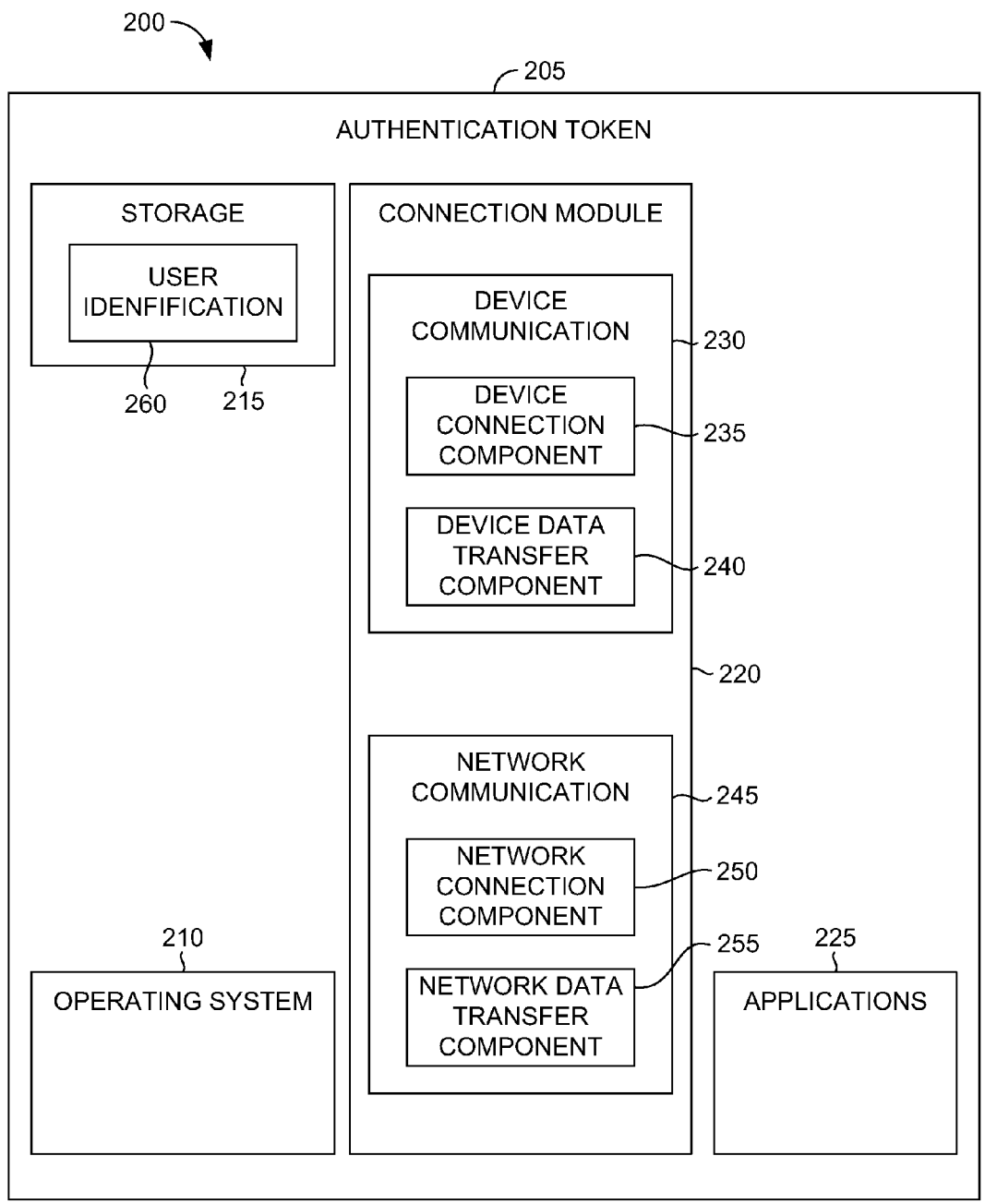
FIG. 2 is a block diagram of an exemplary pocket-size authentication token.

Turning now to FIG. 2, a block diagram is illustrated that shows an overall system architecture 200 for an embodiment of the invention. It will be understood and appreciated by those of ordinary skill in the art that the overall system architecture 200 shown in FIG. 2 is merely an example of one suitable computing environment and is not intended to suggest any limitation as to the scope of use or functionality of the present invention. Neither should the overall system architecture 200 be interpreted as having any dependency or requirement related to any single component/module or combination of components/modules illustrated therein.

With continued reference to FIG. 2, an authentication token 205 includes an operating system 210, a storage module 215, a connection module 220, and an applications module 225. Further, connection module 220 includes a device communication module 230 having a device connection component 235 and a device data transfer component 240, and a network communication module 245 having a network connection component 250 and a network data transfer component 255. The storage module 215 further includes user identification data 260.

The device connection component 235 is configured to connect with a NNE device. The device data transfer component 240 is configured to transfer data to and from a NNE device. The network connection component 250 is configured to connect with a network, utilizing a WNA device. The network data transfer component 255 is configured to transfer data to and from the network, utilizing a WNA device.

The storage module 215 is used for storing, temporarily or on a longer-term basis, a variety of data, including, but not limited to: data received from the network; data received from the NNE device; data to be sent to the network; and data to be sent to the NNE device. Exemplary data received from the network may include, but is not limited to, a command causing a vending machine to place itself out of service, a command causing a vending machine to modify its prices, a command causing a digital camera to initiate a transfer of digital photographs, a command causing a digital camera to terminate a transfer of digital photographs, and the like. It will be appreciated that any variety of data for configuring the authentication token 205 or NNE device may be received from the network. Exemplary data received from a NNE device may include, but is not limited to, the type of NNE device, status of items contained in a vending machine, results of vending machine self diagnostics, digital photographs from a digital camera, size of digital photographs in a digital camera, and the like. It will be appreciated that any variety of data may be received from the NNE device.

Additionally, the storage module 215 stores user identification data in user identification 260. User identification may include, but is not limited to, user name, password, identification of online accounts, or any other type of profile data to be used in accessing a network or online accounts or services. The authentication token 205 automatically, without user intervention, attempts to connect or logon to the network. At least a portion of the user identification data 260 may be provided to the network by the authentication token 205, as part of the logon process. The network may determine whether to permit the logon to complete, based on the user identification data. Additionally, the network may use the user identification data to determine what actions the user is authorized to perform on the network. Furthermore, online accounts or applications may grant or deny access or authorization based on the user identification data.

The applications module 225 may contain various applications performing such functions as user identity management, password management, network connection management, data processing and data conversion, and the like. For example, applications module 225 may process and convert data received from a NNE device into a more useful or different form to be utilized by the network. Applications module 225 may also process and convert data from the network.

Figure 3:
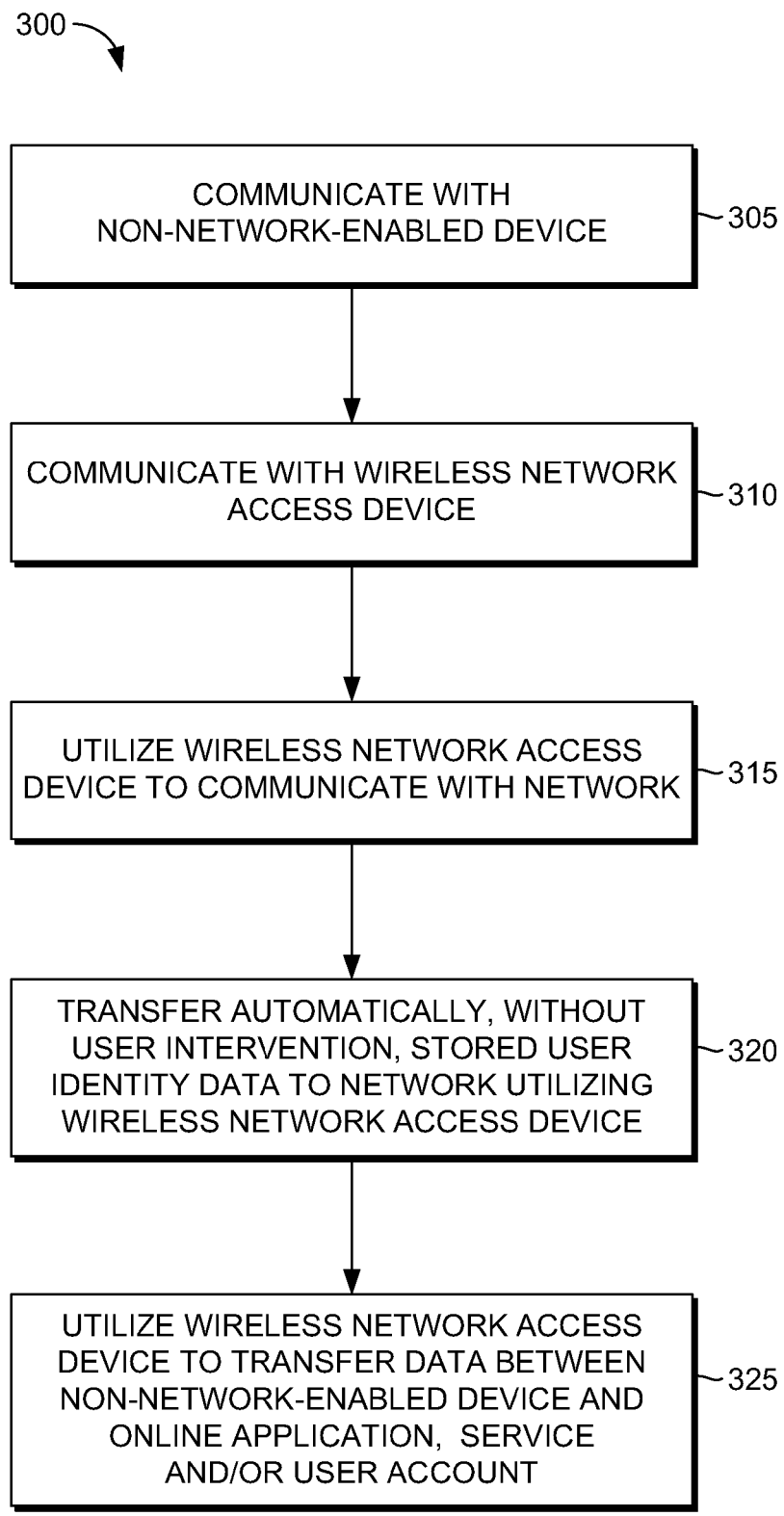
FIG. 3 is a general flow chart illustrative of an exemplary pocket-size authentication token.

Turning now to FIG. 3, a flow chart depicts a method 300 for transferring data between a NNE device and a network. Beginning at step 305 the authentication token communicates with a NNE device. The communication may utilize a variety of protocols, including but not limited to, a USB connection and/or protocol. The NNE device may be any device capable of communicating with the authentication token. Exemplary devices may include, but are not limited to, a digital camera, a vending machine, non-network-enabled computers, printers, scanners, or other devices with communication ports capable of transmitting and/or receiving data.

Next, at step 310 the authentication token communicates with a WNA device. The communication between the authentication token and the WNA device may utilize a variety of protocols, including but not limited to, a USB connection and/or protocol. The WNA device may be any device with the ability to communicate wirelessly with a network, also possessing a communication port compatible with the authentication token. Exemplary WNA devices may include, but are not limited to, a WiMAX card or a card compatible with WiMAX technology, based on the IEEE 802.16 standard or variations thereof, a WiFi card or a card compatible with WiFi technology, based on the IEEE 802.11 standard or variations thereof, and the like.

At step 315, the authentication token utilizes the WNA device to communicate with the network. The authentication token is capable of utilizing the protocols needed in order to communicate with a compatible network. Exemplary protocols may include, but are not limited to, Internet Protocol. The network may be any type of network capable of being accessed via a WNA device. Exemplary networks may include, but are not limited to, a WiMAX network or a network compatible with WiMAX technology, based on the IEEE 802.16 standard or variations thereof, a WiFi network or a network compatible with WiFi technology, based on the IEEE 802.11 standard or variations thereof, and the like.

At step 320, previously stored data identifying a user is automatically, without user intervention, transferred between the authentication token and at least one online account of a user for an online application or service. The stored data identifying the user serves at least to identify the user to the network in order to gain access to the network. The stored data identifying the user may at least be a portion of a user profile that may include, but is not limited to, information related to user identification, user credentials, username, password, online subscription information, and online account information. The entire user profile may be stored in the authentication token, or a portion of the user profile may be stored in the authentication token with the remaining portion(s) residing elsewhere, for instance, on the network.

At step 325, data is transferred by the authentication token between the NNE device and a user account for an online application or service, utilizing the WNA device. The online application or service may be any application or service capable of residing on a network, including but not limited to, Web applications, e-mail access and Internet access. Exemplary user accounts may include, but are not limited to, any type of online access requiring specific authorization or authentication of a user, before granting access to the user. Such an account may require registration, fees, and/or a subscription before granting access to a user. Exemplary user accounts may include, but are not limited to, an account with an online photo sharing website permitting a user to upload digital images to be displayed on the website. Exemplary user accounts may include, but are not limited to, Hotmail.com, Flickr.com, Kodakgallery.com, MySpace.com, and the like.

As mentioned previously, embodiments of the present invention provide apparatuses and methods for wirelessly connecting a NNE device to a network, and for transferring data between the NNE device and the network. An exemplary NNE device may be a digital camera. It may be desirable to transfer images from a digital camera to an account on a network for processing, display, or any number of purposes. An authentication token provides the appropriate communication protocols needed to communicate with a network, using a WNA device. It also provides the appropriate communication protocols to communicate with the camera to retrieve data, such as digital photographs, from the camera. Additionally, it serves to provide user credentials that permit automatic, without user intervention, access to the network and online applications or services.

Other examples of a NNE device may include, but are not limited to, a vending machine. It may be desirable to transfer data from a vending machine to an online application or service so that the owner of the vending machine may monitor its status. Exemplary data may include, but is not limited to: number of each type of item remaining in machine; whether machine is out of change; whether money box is full; and results of self-diagnostics. An authentication token provides the appropriate communication protocols needed to communicate with a network, using a WNA device. It also provides the appropriate communication protocols needed to communicate with the vending machine to retrieve status data, or other data, from the machine. Additionally, it serves to provide user credentials that permit access to the network, online applications or services, and/or an online user account.

Figure 4:
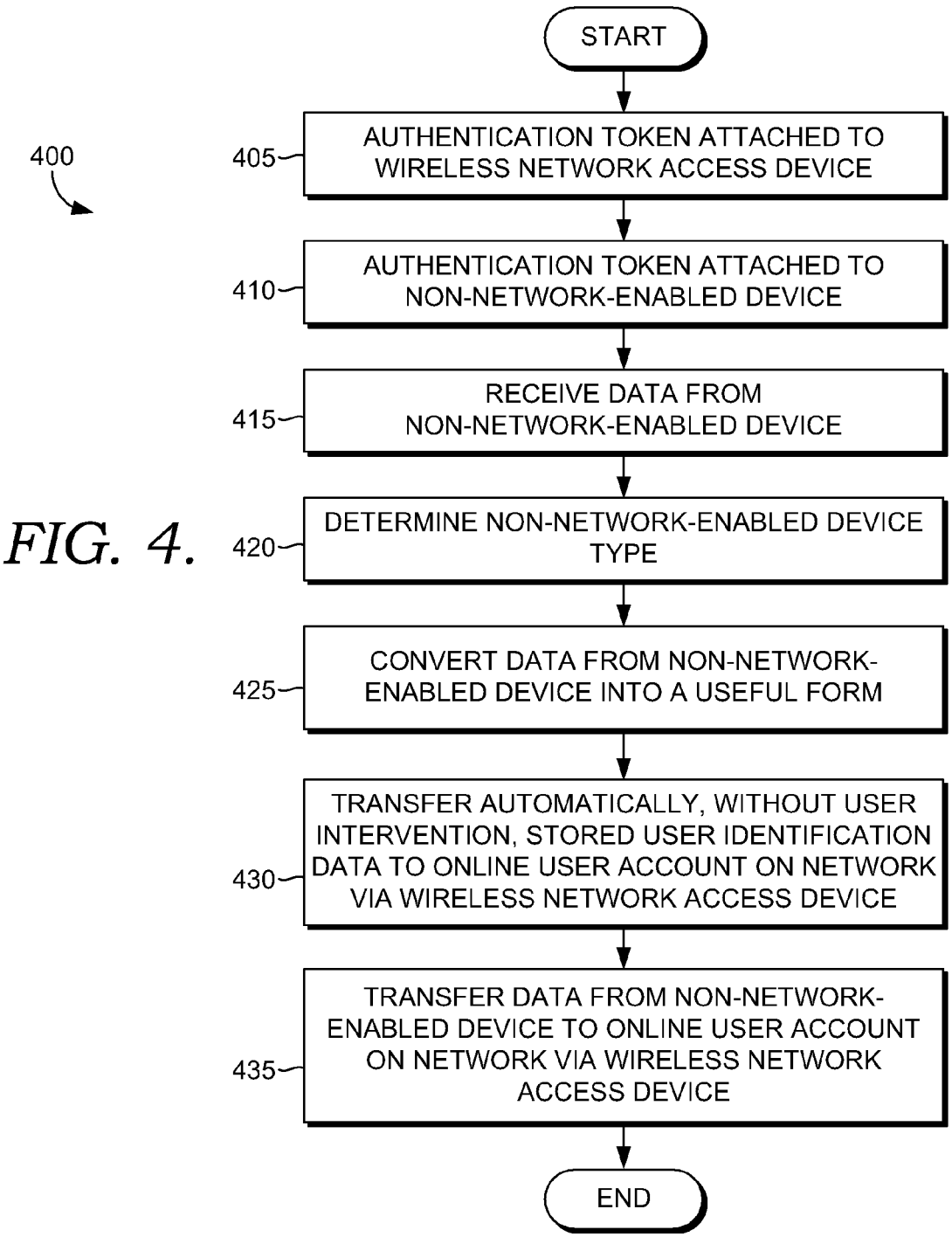
FIG. 4 is a detailed flow chart illustrative of an exemplary pocket-size authentication token wherein the pocket-size authentication token transfers data from a non-network-enabled device to a network.

Turning now to FIG. 4, a flow chart depicts a method 400 for transferring data from NNE device to a network, utilizing a WNA device. Beginning at step 405, an authentication token identifying a single user is attached to a WNA device. The attachment may be accomplished by a user connecting a port of the authentication token to a port of the WNA device. At step 410, the authentication token is attached to a NNE device. The attachment may be accomplished by a user connecting a port of the authentication token to a port of the NNE device. Exemplary ports may include, but are not limited to, USB ports in the form of a male mini-USB connector for coupling with the NNE device and a male USB connector for coupling with the WNA device. Another exemplary port for coupling with the WNA device is a card slot compatible with a personal computer card (PC card).

Upon being attached to the WNA device and the NNE device, the authentication token receives data from the NNE device at step 415. The authentication token then determines the type of the NNE device at step 420. For example, whether the NNE device is a digital camera, a vending machine, a scanner, etc. This helps the authentication token process data received from the NNE device. For example, digital pictures may be processed differently from vending machine data. At step 425, the data from the NNE device may be converted into a useful form. User identification data stored in the authentication token is transferred automatically, without user intervention, to the network, utilizing the WNA device at step 430. Data from the NNE device is transferred at step 435 to the network, and may be transferred to an online user account or service, utilizing the WNA device.

Figure 5:
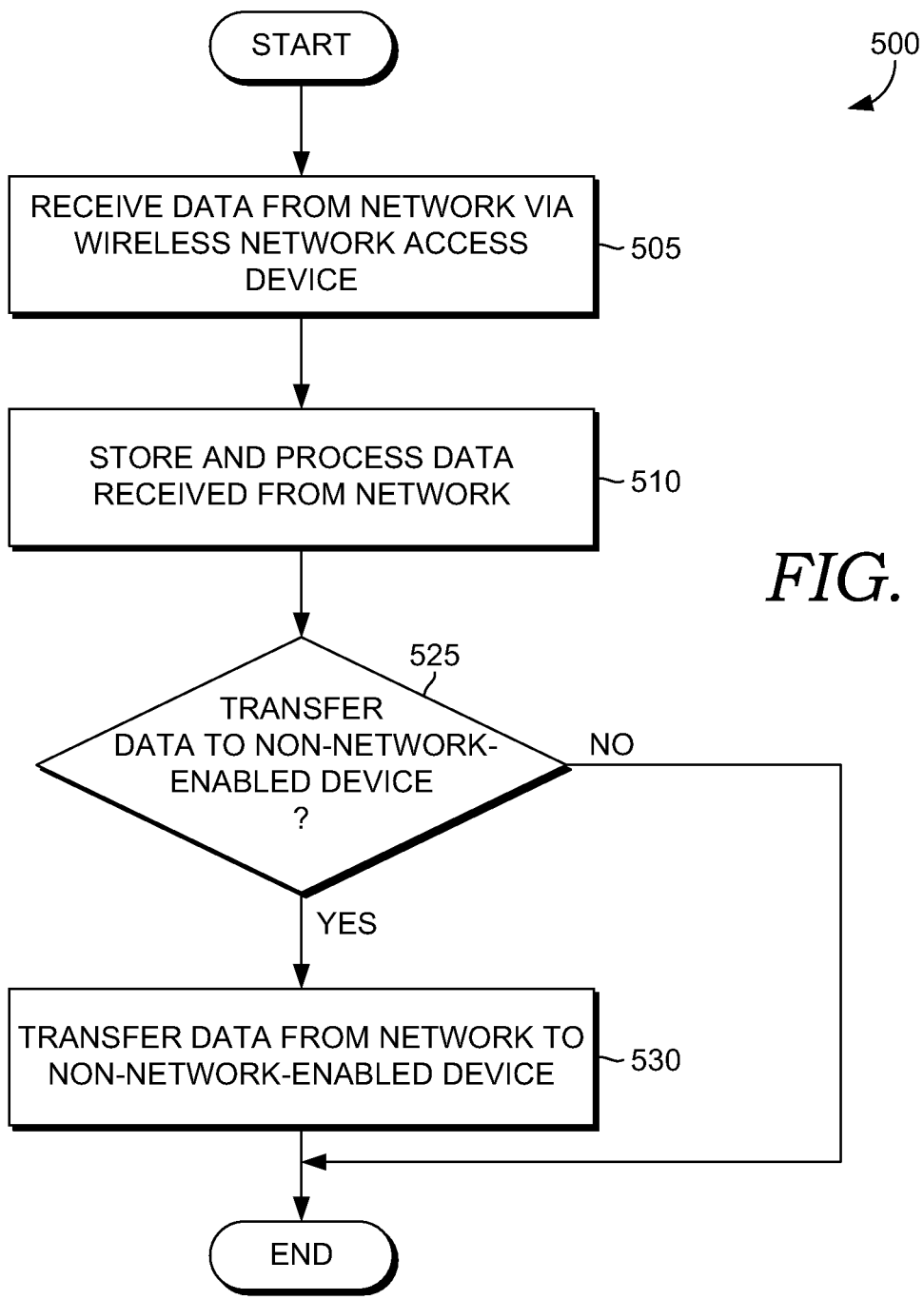
FIG. 5 is a detailed flow chart illustrative of an exemplary pocket-size authentication token wherein the pocket-size authentication token receives data from a network and may store the data or transfer the data to a non-network-enabled device.

Turning now to FIG. 5, a flow chart depicts a method 500 for transferring data from a network to a NNE device. At step 505, the authentication token receives data from the network, utilizing the WNA device. The data is stored and processed by the authentication token at step 510. The authentication token determines whether the data from the network is to be transferred to the NNE device at step 525. If so, then the data is transferred to the NNE device at step 530. Exemplary data to be transferred to the NNE device may include, but is not limited to, a command causing a vending machine to place itself out of service, a command causing a vending machine to modify its prices, a command causing a digital camera to initiate a transfer of digital photographs, a command causing a digital camera to terminate a transfer of digital photographs, and a variety of other data depending on the type of NNE device. Exemplary data from the network may also be retained in the authentication token. For example, updates to stored applications, updates to the operating system, updates to the user profile, updates to configuration data, and a variety of other data, may be stored or retained in the authentication token.

FIGS. 6, 7, 8 and 9 illustrate exemplary perspective views of pocket-size user identification systems. The particular embodiments and configurations herein are intended in all respects to be illustrative rather than restrictive. Alternative embodiments and configurations of a pocket-size user identification system will become apparent to those skilled in the art to which the present invention pertains without departing from its scope. Pocket-size refers to a size that is small enough, or almost small enough, to be carried in someone's pocket.

Figure 6:
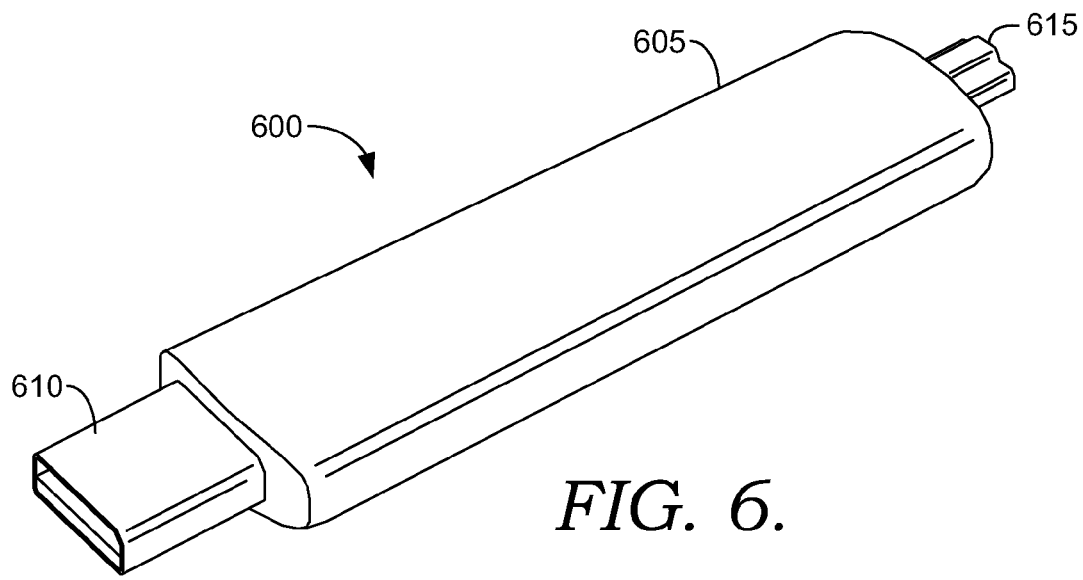
FIG. 6 is a perspective view of an exemplary pocket-size authentication token having a Universal Serial Bus connector and a miniature Universal Serial Bus (USB) connector.

FIG. 6 depicts a user identification system 600. The user identification system 600 is but one example of a user identification system and is not intended to suggest any limitation as to the scope of use or functionality of the invention. Neither should the user identification system 600 be interpreted as having any dependency or requirement relating to any one or combination of components/modules illustrated. Continuing with reference to FIG. 6, the user identification system 600 includes an authentication token 605 mechanically coupled to a USB network connector 610 and a mini-USB NNE device connector 615. The USB network connector 610 may couple with a USB WNA device, examples of which may include, but are not limited to, a WiMAX card or a WiFi card. The mini-USB NNE device connector 615 may couple with a NNE device having a USB port, examples of which may include, but are not limited to, a digital camera, a vending machine, non-network-enabled computers, printers, and scanners.

Figure 7:
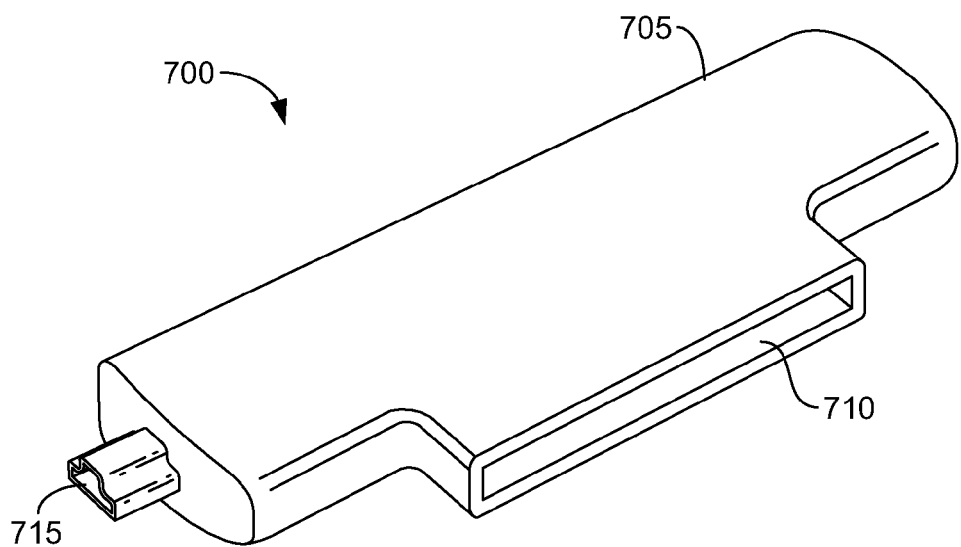
FIG. 7 is a perspective view of an exemplary pocket-size authentication token having a personal computer card slot and a miniature USB connector.

FIG. 7 depicts an exemplary user identification system 700. The user identification system 700 is but one example of a user identification system and is not intended to suggest any limitation as to the scope of use or functionality of the invention. Neither should the user identification system 700 be interpreted as having any dependency or requirement relating to any one or combination of components/modules illustrated. Continuing with reference to FIG. 7, the user identification system 700 has an authentication token 705 incorporating a PC card slot network connector 710 and a mini-USB NNE device connector 715. The PC card slot network connector 710 couples with a PC card compatible WNA device, examples of which may include, but are not limited to, a WiMAX card or a WiFi card. The mini-USB NNE device connector 715 couples with a NNE device having a mini-USB port, examples of which may include, but are not limited to, a digital camera, a vending machine, non-network-enabled computers, printers, and scanners.

Figure 8:
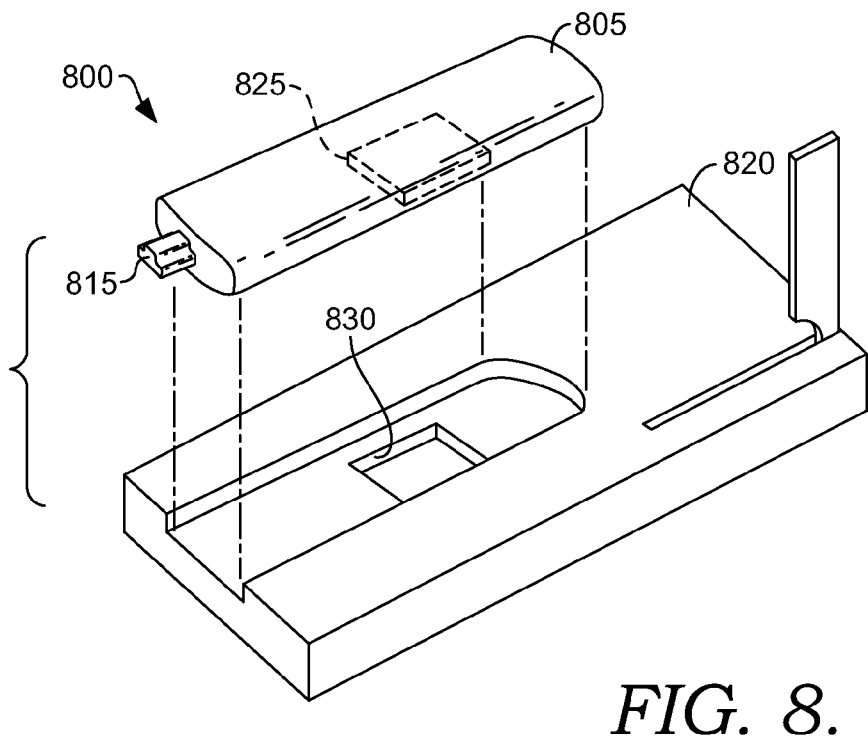
FIG. 8 is a perspective view of an exemplary pocket-size authentication token having a miniature USB connector and illustrating how the pocket-size authentication token mechanically couples with a wireless network access device.

FIG. 8 depicts a user identification system 800. The user identification system 800 is but one example of a user identification system and is not intended to suggest any limitation as to the scope of use or functionality of the invention. Neither should the user identification system 800 be interpreted as having any dependency or requirement relating to any one or combination of components/modules illustrated. Continuing with reference to FIG. 8, the user identification system 800 includes an authentication token 805 with a mini-USB NNE device connector 815. The authentication token 805 physically couples with a wireless network access card 820 and electrically couples with the wireless network access card, via a connector 825 and a connector 830. The connectors 825 and 830 may be any suitable connectors for communicating with the WNA device. Exemplary connectors may include, but are not limited to, male and female USB connectors. The mini-USB NNE device connector 815 couples with a NNE device, examples of which may include, but are not limited to, a digital camera, a vending machine, non-network-enabled computers, printers, and scanners. Examples of a wireless network access card 820 may include, but are not limited to, a WiMAX card or a WiFi card.

Figure 9:
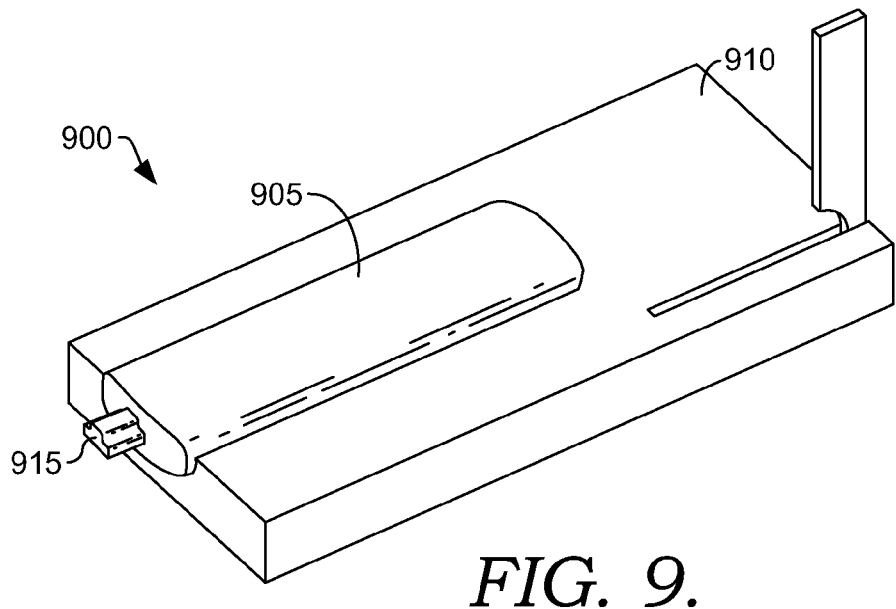
FIG. 9 is a perspective view of an exemplary pocket-size authentication token having a miniature USB connector and depicting the pocket-size authentication token coupled with a wireless network access device.

FIG. 9 depicts a user identification system 900. The user identification system 900 is but one example of a user identification system and is not intended to suggest any limitation as to the scope of use or functionality of the invention. Neither should the user identification system n 900 be interpreted as having any dependency or requirement relating to any one or combination of components/modules illustrated. Continuing with reference to FIG. 9, the user identification system 900 includes an authentication token 905 physically coupled with a wireless network access card 910. The wireless network access card is depicted having a mini-USB NNE device connector 915. The mini-USB NNE device connector 915 couples with a NNE device, examples of which may include, but are not limited to, a digital camera, a vending machine, non-network-enabled computers, printers, and scanners. Examples of a wireless network access card 910 may include, but are not limited to, a WiMAX card or a WiFi card.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A pocket-size authentication token apparatus for authenticating a user to a network, the apparatus comprising:
 a Universal Serial Bus (USB) device connector for coupling and communicating with a non-network-enabled device;
 a network connector for physically coupling with a communications port of a separate wireless network access device and communicating with the separate wireless network access device, wherein said network connector is in addition to said USB device connector;
 a storage device for storing user profile data associated with the user;
 one or more computer-readable media having computer-useable instructions embodied thereon for connecting the non-network-enabled device to the network by providing a network communication protocol needed to communicate with the network;
 one or more computer-readable media having computer-useable instructions embodied thereon for automatically, without user intervention, using profile data stored on the storage device to access an online account for said user on a network, utilizing said network communication protocol via said wireless network access device;
 one or more computer-readable media having computer-useable instructions embodied thereon for receiving and storing data from said non-network-enabled device via said USB device connector;
 one or more computer-readable media having computer-useable instructions embodied thereon for transferring said data from said non-network-enabled device to said automatically accessed online account for said user, utilizing said wireless network access device;
 one or more computer-readable media having computer-useable instructions embodied thereon for receiving and storing data from said online account, wherein said data from said online account comprises commands to the non-network-enabled device based on the type of non-network-enabled device; and
 one or more computer-readable media having computer-useable instructions embodied thereon for determining whether said data from said online account is to be transferred to the non-network-enabled device and transferring said data from said online account to said non-network-enabled device via said USB device connector.

2. The apparatus of claim 1, further comprising an electrical interface for transferring input/output data to and from said non-network-enabled device.

3. The apparatus of claim 2, further comprising an electrical interface for transferring input/output data to and from said network, utilizing said wireless network access device.

4. The apparatus of claim 1, further comprising one or more computer-readable media having computer-useable instructions embodied thereon for storing at least data identifying said user.

5. The apparatus of claim 4, wherein said electrical interface for transferring input/output data to and from said non-network-enabled device and said wireless network access device is a Universal Serial Bus (USB) interface.

6. The apparatus of claim 4, wherein said wireless network access device is a Worldwide Interoperability for Microwave Access (WiMAX) device.

7. Non-transitory computer-readable media having computer-useable instructions embodied thereon for performing a method for authenticating an individual to a network, the method comprising:
 communicating with a non-network-enabled device via a Universal Serial Bus (USB) connection;
 communicating with a separate wireless network access device via a connector that physically and electrically couples with a communications port of said wireless network access device, wherein said connector is in addition to said USB connection;
 automatically, without user intervention, using user-profile data to access an online account for said individual on a network, utilizing said wireless network access device, wherein said non-network-enabled device is connected to said network;
 receiving and storing data from said non-network-enabled device;
 receiving, from said non-network-enabled device, an indication of a type of said non-network-enabled device;
 sending a command to said non-network-enabled device based on said type of said non-network-enabled device;
 determining a type of processing to perform on said data to convert it into a form useful for said online account, based directly on said type of said non-network-enabled device;
 performing said processing on said data, wherein said data is converted into a form that is useful for said online account;
 transferring converted data from said non-network-enabled device to said automatically accessed online account, utilizing said separate wireless network access device.

8. The method of claim 7, further comprising transferring and storing data to and from said non-network-enabled device.

9. The method of claim 8, further comprising transferring and storing data to and from said network, utilizing said wireless network access device.

10. The method of claim 9, further comprising storing said data identifying said one individual.

11. The method of claim 10, wherein said communicating with said wireless network access device further comprises utilizing Universal Serial Bus (USB) for said communication.

12. The method of claim 10, wherein said wireless network access device is a Worldwide Interoperability for Microwave Access (WiMAX) device.

13. The method of claim 12, wherein said network is a Worldwide Interoperability for Microwave Access (WiMAX) network or a network compatible with Worldwide Interoperability for Microwave Access technology, based on the IEEE 802.16 standard or variations thereof.

14. A system for identifying a non-network-enabled device to a network, the system comprising:
- an authentication token comprising:
  - (A) a storage device for storing profile data for said non-network-enabled device,
  - (B) one or more computer-readable media having computer-useable instructions embodied thereon for connecting the non-network-enabled device to the network by providing a network communication protocol needed to communicate with the network,
  - (C) one or more computer-readable media having computer-useable instructions embodied thereon for automatically, without user intervention, using profile data stored on the storage device to access an online account for said non-network-enabled device on said network, utilizing said network communication protocol via a separate wireless network access device,
  - (D) one or more computer-readable media having computer-useable instructions embodied thereon for receiving and storing data from said non-network-enabled device,
  - (E) one or more computer-readable media having computer-useable instructions embodied thereon for determining a type of processing to perform on said data to convert it into a form useful for said online account, based directly on said type of said non-network-enabled device and transferring said data from said non-network-enabled device to said automatically accessed online account for said individual, utilizing said separate wireless network access device, and
  - (F) one or more computer-readable media having computer-useable instructions embodied thereon for receiving, from the network by way of said separate wireless network access device, a command depending on the type of non-network-enabled device that is intended for the non-network-enabled device and communicating the command to said non-network-enabled device;
- a Universal Serial Bus (USB) device connector mechanically coupled to said pocket-size authentication token and for removably connecting said pocket-size authentication token to said non-network-enabled device, wherein said non-network-enabled device includes any device having a USB communication port that is compatible with said USB device connector, and that is configured to communicate with said pocket-size authentication token; and
- a network connector mechanically coupled to said pocket-size authentication token and for physically connecting said pocket-size authentication token to a communications port of said separate wireless network access device, wherein said network connector is in addition to said USB device connector.

15. The system of claim 14, further comprising one or more computer-readable media having computer-useable instructions embodied thereon for transferring and storing data to and from said network, utilizing said wireless network access device.

16. The system of claim 15, further comprising one or more computer-readable media having computer-useable instructions embodied thereon for storing at least data identifying said non-network-enabled device.

17. The system of claim 14, wherein said USB device connector is a male miniature Universal Serial Bus (mini-USB) connector and said network connector is a male Universal Serial Bus (USB) connector.

18. The system of claim 14, wherein said USB device connector is a male miniature Universal Serial Bus (mini-USB) connector and said network connector is a card slot compatible with a personal computer card (PC card).

19. The system of claim 14, wherein said USB device connector is a male miniature Universal Serial Bus (mini-USB) connector and said pocket-size authentication token physically and electrically couples with said wireless network access device.

* * * * *